US008493475B2

(12) United States Patent
Niimura

(10) Patent No.: US 8,493,475 B2
(45) Date of Patent: Jul. 23, 2013

(54) IMAGING APPARATUS AND CONTROL METHOD THEREOF

(75) Inventor: Ikuo Niimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 12/834,780

(22) Filed: Jul. 12, 2010

(65) Prior Publication Data

US 2011/0013026 A1    Jan. 20, 2011

(30) Foreign Application Priority Data

Jul. 15, 2009 (JP) ................................. 2009-167128

(51) Int. Cl.
*H04N 5/76* (2006.01)
(52) U.S. Cl.
USPC ............. 348/231.99; 348/207.99; 348/208.15
(58) Field of Classification Search
USPC ........................... 348/208.15, 207.99, 231.99
See application file for complete search history.

(56) References Cited

U.S. PATENT DOCUMENTS

| 2001/0017664 A1* | 8/2001 | Misawa | 348/373 |
| 2004/0212735 A1* | 10/2004 | Kitamura | 348/553 |
| 2006/0039221 A1* | 2/2006 | Fukuda | 365/222 |

FOREIGN PATENT DOCUMENTS

JP     2003-134377     5/2003

* cited by examiner

*Primary Examiner* — Roberto Velez
*Assistant Examiner* — Yih-Sien Kao
(74) *Attorney, Agent, or Firm* — Carter, DeLuca, Farrell & Schmidt LLP

(57) ABSTRACT

An imaging apparatus includes an image recording unit configured to record captured image data on a first recording medium with no wireless communication function and a second recording medium with a wireless communication function, which is detachable, a recording destination setting unit configured to set a recording destination on which to record the image data by the image recording unit, and a transmission setting unit configured to set whether to transmit the image data to an external apparatus by the wireless communication function of the second recording medium. If the transmission setting unit sets the image data to be transmitted to the external apparatus, the recording destination setting unit automatically sets the second recording medium as the recording destination of the captured image data.

10 Claims, 8 Drawing Sheets

IMAGING APPARATUS AND CONTROL METHOD THEREOF

BACKGROUND OF THE INVENTION

1. Field of the Invention

The present invention relates to an imaging apparatus to which a recording medium with wireless communication function can be mounted, and a control method and a program thereof.

2. Description of the Related Art

It is necessary for a camera provided with a plurality of recording media for recording a captured image to select a recording medium therefore from among the plurality of recording media and control the recording medium. For example, a camera discussed in Japanese Patent Application Laid-Open No. 2003-134377 sets a priority order among recording media for recording based on a shooting date and time of a captured image, a shooting mode, and a shooting object, and then selects a recording medium for recording the captured image based on the priority order.

Some cameras allow a user to select a method for recording a captured image. Such cameras can simultaneously record the captured image on a plurality of recording media, automatically switch a recording medium in use having no more capacity to another recording medium, or separately record the captured image on the recording media for recording an image depending on the size of the captured image.

Further, recording media have been produced that have both of a function as a recording media and a communication function such as a wireless local area network (LAN). Similar to the recording media such as a CompactFlash (CF) card and a secure digital (SD) card that are detachable with respect to a camera, such a recording medium is inserted into a slot for a recording medium of a camera when being used. The recording medium with communication function can be also used as a recording medium of a captured image. Further, when an image is recorded on the recording medium and an image file exists, the recording medium with communication function can automatically transmit the image file to a previously-set transmission destination via a wireless LAN.

However, the recording medium with communication function does not look different from a normal recording medium when viewed from the side of a camera. Thus, when the recording medium with communication function is used or when the recording medium with communication function is used with a plurality of recording media, to use the communication function, the user is required to set the recording medium with communication function as the recording destination.

SUMMARY OF THE INVENTION

According to an aspect of the present invention, an imaging apparatus includes an image recording unit configured to record captured image data on a first recording medium with no wireless communication function and a second recording medium with a wireless communication function, which is detachable, a recording destination setting unit configured to set a recording destination on which to record the image data by the image recording unit, and a transmission setting unit configured to set whether to transmit the image data to an external apparatus by the wireless communication function of the second recording medium. If the transmission setting unit sets the image data to be transmitted to the external apparatus, the recording destination setting unit automatically sets the second recording medium as the recording destination of the captured image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Exemplary embodiments, features, and aspects of the invention will be described in detail below with reference to the drawings.

In a first exemplary embodiment of the present invention, as an imaging apparatus, a digital single-lens reflex camera (hereafter, referred to as a "camera") will be described.

Figure 1A:
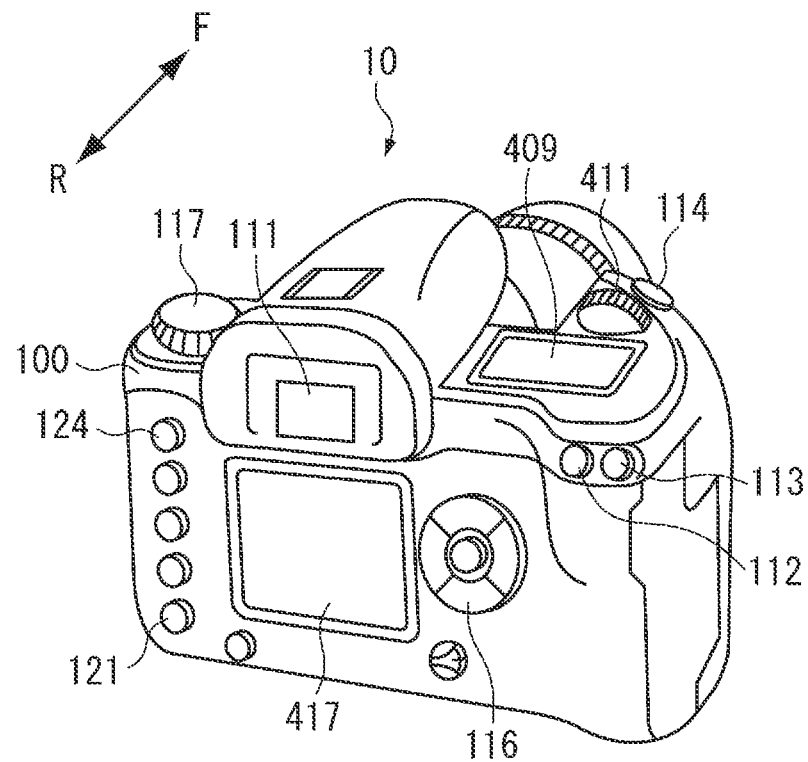
FIGS. 1A and 1B illustrate basic configurations of a camera according to an exemplary embodiment of the present invention.
Figure 1B:
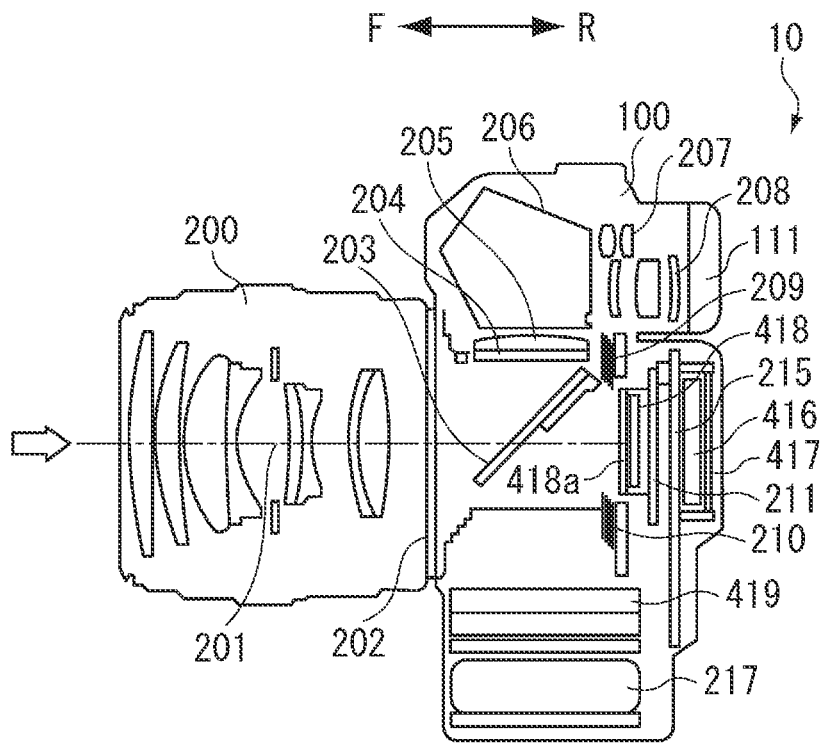

FIGS. 1A and 1B illustrate basic configurations of the camera. In FIGS. 1A and 1B, a forward (front side) of the camera 10 is indicated with "F", and a backward (rear side) thereof is indicated with "R". As illustrated in FIG. 1A, at an upper portion of a camera body 100, the camera 10 includes an eyepiece window 111 for observing a finder, an automatic exposure (AE) lock button 112, and a focusing-point selection button 113 for automatic focus adjustment (AF).

Further, the camera 10 includes a release button 114 for giving an instruction for capturing an image. The release button 114 can perform input in two steps of a half pressed state (SW1) and a fully pressed state (SW2).

Furthermore, the camera 10 includes an electronic dial 411, a shooting mode selection dial 117, and an external display device (liquid crystal display (LCD)) 409. A user can change a shooting mode by turning the shooting mode selection dial 117. The shooting mode includes, for example, a shutter speed priority mode, a program shooting mode, and a nightscape mode. The external display device 409 includes a liquid crystal display device, and displays shooting conditions such as a shutter speed, an aperture value, and a development mode, or other information.

Moreover, the camera 10 includes an LCD monitor device 417 for displaying the captured image, a correction-processed image, and various types of setting screens such as a menu screen on a rear face of the camera body 100. Since the LCD monitor device 417 of the present exemplary embodiment is of the transmissive type, an image cannot be viewed only by driving the LCD monitor device 417.

Therefore, the camera 10 includes a backlight illumination device 416 at a back side of the LCD monitor device 417 as illustrated in a horizontal cross sectional view in FIG. 1B, which will be described below. In other words, an image display device of the camera 10 includes the LCD monitor device 417 and the backlight illumination device 416.

Further, the camera 10 includes a monitor switch 121 for turning on/off the LCD monitor device 417, a cross switch (arrow key) 116, and a menu button 124 at a rear face of the camera body 100. The cross switch 116 includes a SET button disposed at a center and four buttons disposed at the top, bottom, right, and left thereof.

The user can give an instruction for selecting and performing a menu displayed on the LCD monitor device 417 to the camera 10 via the cross switch 116. The menu button 124 is used to display a menu screen for performing various types of settings of the camera 10 on the LCD monitor device 417. For example, when the setting of the camera displayed on the LCD monitor device 417 is changed, the user presses the menu button 124, operates the top, bottom, right, and left buttons of the cross switch 116, and then presses the SET button with a desired mode selected to set the desired mode.

FIG. 1B is a horizontal cross sectional view illustrating a basic configuration of the camera 10. In FIG. 1B, the forward (front side) of the camera 10 is indicated with "F", and the backward (rear side) thereof is indicated with "R". As illustrated in FIG. 1B, regarding the camera 10, a photographic lens 200, which is an imaging optical system, is detachable with respect to the camera body 100 via a lens mount 202.

Furthermore, the camera 10 includes a quick return mirror 203 on a shooting optical axis 201. The quick return mirror 203 is disposed in a shooting light path, and can move between a position (obliquely disposed position) illustrated in FIG. 1B for leading object light from the photographic lens 200 to a finder optical system and a position (retracted position) for retracting to the outside of the shooting light path. The object light led from the quick return mirror 203 at the obliquely disposed position to the finder optical system forms an image on a focusing screen 204.

Moreover, the camera 10 includes a condenser lens 205 and a pentagonal roof prism 206 for improving visibility via the finder. The object light that has passed through the focusing screen 204 and the condenser lens 205 is led to an automatic exposure sensor 207 and an eyepiece lens 208 for observing a finder image by the pentagonal roof prism 206.

Further, at a rear side of the quick return mirror 203, the camera 10 includes a second curtain 209 and a first curtain 210 that constitute a shutter, and an image sensor 418 for photoelectrically converting the object image. When the second curtain 209 and the first curtain 210 are opened, the image sensor 418 disposed at a rear side thereof is exposed to light for a predetermined time. The captured image converted into an electric signal for each pixel by the image sensor 418 is processed by an analog/digital (A/D) converter 423 and an image processing circuit 425 illustrated in FIG. 2, which will be described below. The processed, captured image is then recorded on a recording medium as image data.

The image sensor 418 includes an optical low-pass filter 418*a* at a front surface thereof. The optical low-pass filter 418*a* adjusts a spatial frequency of an object image formed on the image sensor 418. The image sensor 418 is retained on a printed circuit board 211.

Furthermore, the camera 10 includes a display circuit board 215, which is a printed circuit board different from the printed circuit board 211 and disposed therebehind, and LCD monitor device 417 and a back light illumination device 416 described in FIG. 1A on a surface of the other side of the display circuit board 215.

Moreover, the camera 10 includes a recording medium interface (I/F) (slot for a recording medium) 419 for recording image data and a battery (portable power source) 217. The recording medium to be connected to the recording medium I/F 419 and the battery 217 are detachable from the camera body 100. When the user attaches/detaches the recording medium, an insertion cap (not illustrated) of the recording medium provided to the camera body 100 is opened.

Figure 2:
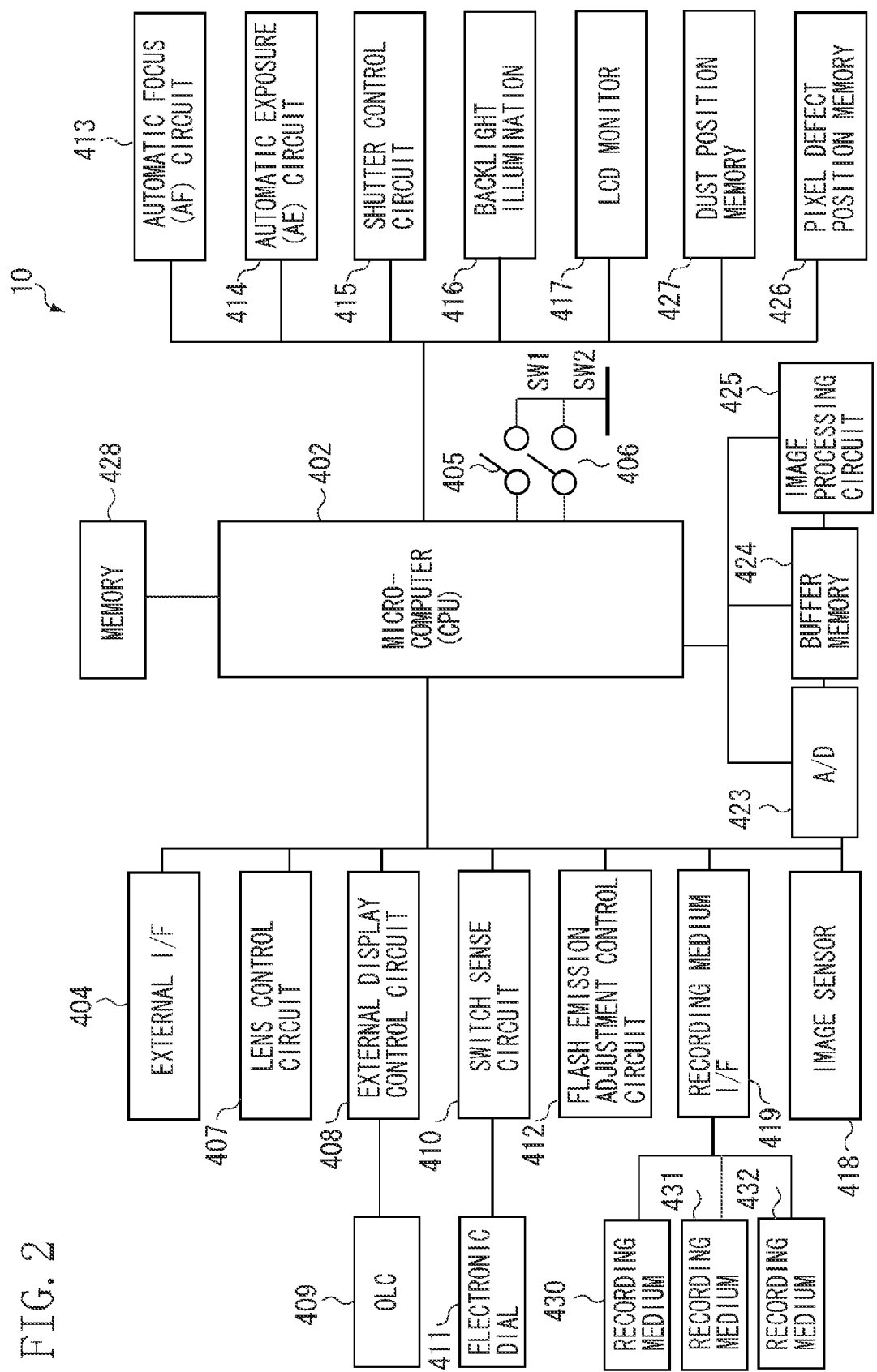
FIG. 2 is a block diagram illustrating a configuration of a circuitry of the camera.

FIG. 2 is a block diagram illustrating a configuration of a circuitry of the camera. In FIG. 2, a microcomputer (hereafter referred to as a "central processing unit (CPU)") 402 controls processing of the image data output by the image sensor 418, display of the LCD monitor device 417, and the entire operation of the camera 10. A switch (SW1) 405 is turned on, when the release button 114 is half pressed. When the switch (SW1) 405 is turned on, the CPU 402 proceeds to a capturing-image preparation state.

A switch (SW2) 406 is turned on, when the release button 114 is fully pressed (fully pressed state). When the switch (SW2) 406 is turned on, the CPU 402 starts a capturing operation.

A lens control circuit 407 performs communication with the photographic lens 200, driving control of the photographic lens 200 when AF is performed, and driving control of the second curtain 209 and the first curtain 210. An external display control circuit 408 performs control of an external display device (OLC) 409 and a display device (not illustrated) in the finder. A switch sense circuit 410 transmits to the CPU 402 signals from a number of switches including an electronic dial 411 provided on the camera 10.

A flash emission adjustment control circuit 412 is grounded via an "X" connection point and performs control of an external flash unit. An automatic focus (AF) circuit 413 detects an amount of defocus with respect to the object to perform AF. An automatic exposure (AE) circuit 414 measures brightness of the object. A shutter control circuit 415 performs control on the shutter and optimum exposure on the image sensor 418. The backlight illumination device 416 and the LCD monitor device 417 are included in the image display device.

The recording medium I/F 419 is, for example, an interface for inserting a hard disk drive or a semiconductor memory card that is detachable from the camera body 100. The camera 10 of the present exemplary embodiment includes a plurality of SD card slots as the recording medium I/F 419. However, the recording medium I/F 419 is not limited to the SD card slot but may be a CF card slot.

As illustrated in FIG. 2, the camera 10 can be connected to a plurality of recording media 430, 431, and 432. In other words, the camera 10 of the present exemplary embodiment includes a plurality of recording I/Fs, into which a plurality of recording media can be inserted. According to the present exemplary embodiment, all of the recording media 430, 431, and 432 are detachable. However, at least one may be detachable and other media may be built in the camera 10.

The camera 10 includes the A/D converter 423, a buffer memory 424, and the image processing circuit 425 formed of a digital signal processor (DSP).

The camera 10 includes a pixel defect position memory 426 storing a certain pixel that has a defect in the image sensor 418, a dust position memory 427 storing a position of a pixel that has a deterioration of the image caused by dust in the image sensor 418, a memory 428, and an external interface (I/F) 404. The memory 428 is a non-volatile memory storing a program to be executed by the CPU 402. The external I/F 404 is used to communicate with an external apparatus via a wireless or a wire.

For conventional cameras in which a plurality of recording media such as a CF card or a SD card can be used, the user sets what type of image data is to be recorded on what recording medium via a graphical user interface.

The present exemplary embodiment will describe a camera that can use a plurality of recording media and access a recording medium having only a normal recording function and a recording medium having a recording function of data and a communication function. When the camera 10 accesses the respective two types of recording media described above, the I/F for the recording media such as the CF card I/F or the SD card I/F is used. However, the I/F is not limited to a specific I/F but may be a different type of I/F as long as an I/F can be controlled by the camera 10.

Figure 3A:
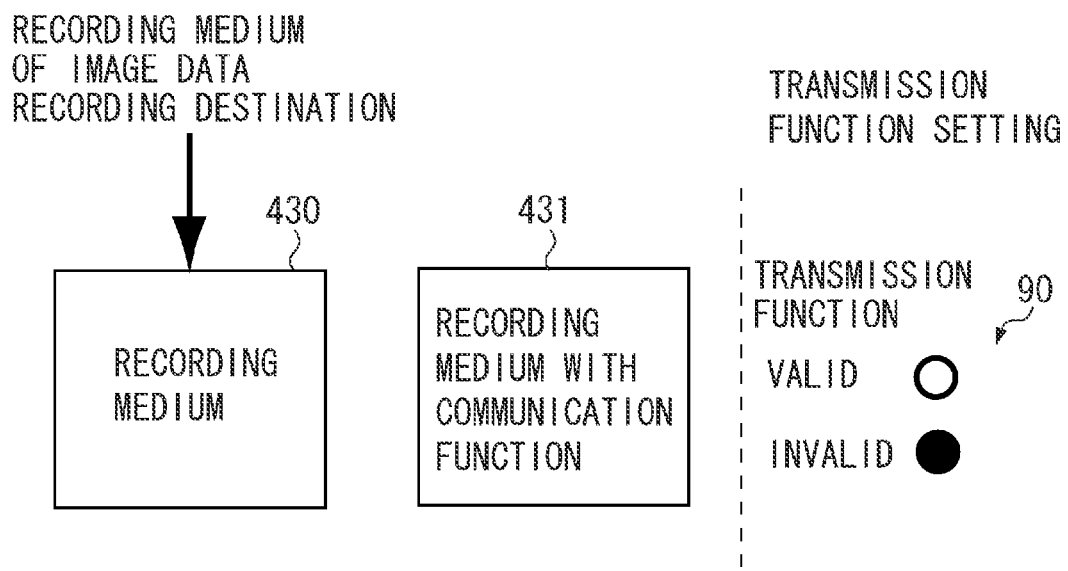
FIGS. 3A and 3B schematically illustrate processing performed by the camera according to a first exemplary embodiment of the present invention.
Figure 3B:
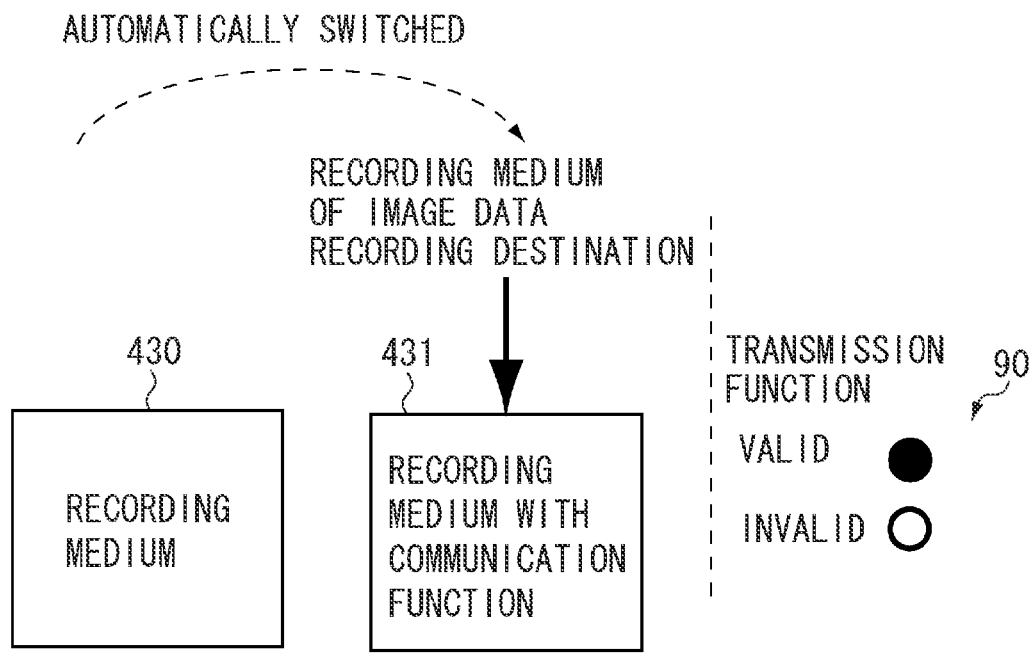

FIGS. 3A and 3B schematically illustrate operations performed by the camera of the present exemplary embodiment. The recording medium with no communication function and the recording medium with communication function are mounted to the camera 10 of the present exemplary embodiment. The recording medium with communication function described in the present exemplary embodiment includes a wireless communication unit such as an antenna. When a transmission function is set valid by the camera body 100, the recording medium with communication function transmits the image data written therein to an external apparatus.

The camera 10 of the present exemplary embodiment sets the recording medium of a recording destination according to a setting of whether to transmit the image data to an external apparatus. In FIGS. 3A and 3B, the recording medium 430 with a normal data recording function and no communication function and the recording medium 431 with a data recording function and a communication function are inserted into slots for a recording medium. In other words, FIGS. 3A and 3B illustrate that the recording medium 430 and the recording medium 431 are each connected to the recording medium I/F 419.

Firstly, in FIG. 3A, a setting of the transmission function 90 about whether to transmit the image data to an external apparatus is set invalid. Information for setting the transmission function 90 invalid is stored in the memory 428. As illustrated in FIG. 3A, when the transmission function is set invalid, the normal recording medium 430 is automatically set as a recording destination. More specifically, captured image data, which is image-processed by the image processing circuit 425, is stored in the buffer memory 424 and then stored in the normal recording medium 430 via the recording medium I/F 419.

Next, the user sets the transmission function valid from being invalid. More specifically, the user turns on the LCD monitor device 417 by the monitor switch 121, and presses the menu button 124 to display the GUI menu on the LCD monitor device 417. The user uses the cross switch 116 to display the setting menu on the communication setting screen, and then changes the transmission function to being valid from invalid. The CPU 402 stores the setting information about the valid transmission function in the memory 428.

When the transmission function 90 is set valid as illustrated FIG. 3B, the recording medium 431 with communication function is automatically set as the recording destination of the image data. In other words, the recording medium 430 is automatically switched to the recording medium 431 with communication function to record the image data via the recording medium I/F 419. With this arrangement, the captured image data recorded on the recording medium 431 with communication function is transmitted to the external apparatus by the communication function of the recording medium 431.

According to the present exemplary embodiment, among the recording media 430, 431 and 432 illustrated in FIG. 2, a normal recording medium is defined as the recording medium 430 and a recording medium with communication function is defined as the recording medium 431. The CPU 402 accesses a predetermined recording medium via the recording medium I/F 419 and stores in the predetermined recording medium the image data stored in the buffer memory 424.

The user can select what image size of the image data is to be stored in which recording medium from the GUI menu using an external operation unit such as the cross switch 116 to make a determination. Further, from the above-described GUI menu, the user can set whether to transmit the image data to the external apparatus via the wireless communication such as a wireless LAN access point or a public wireless LAN.

Figure 4:
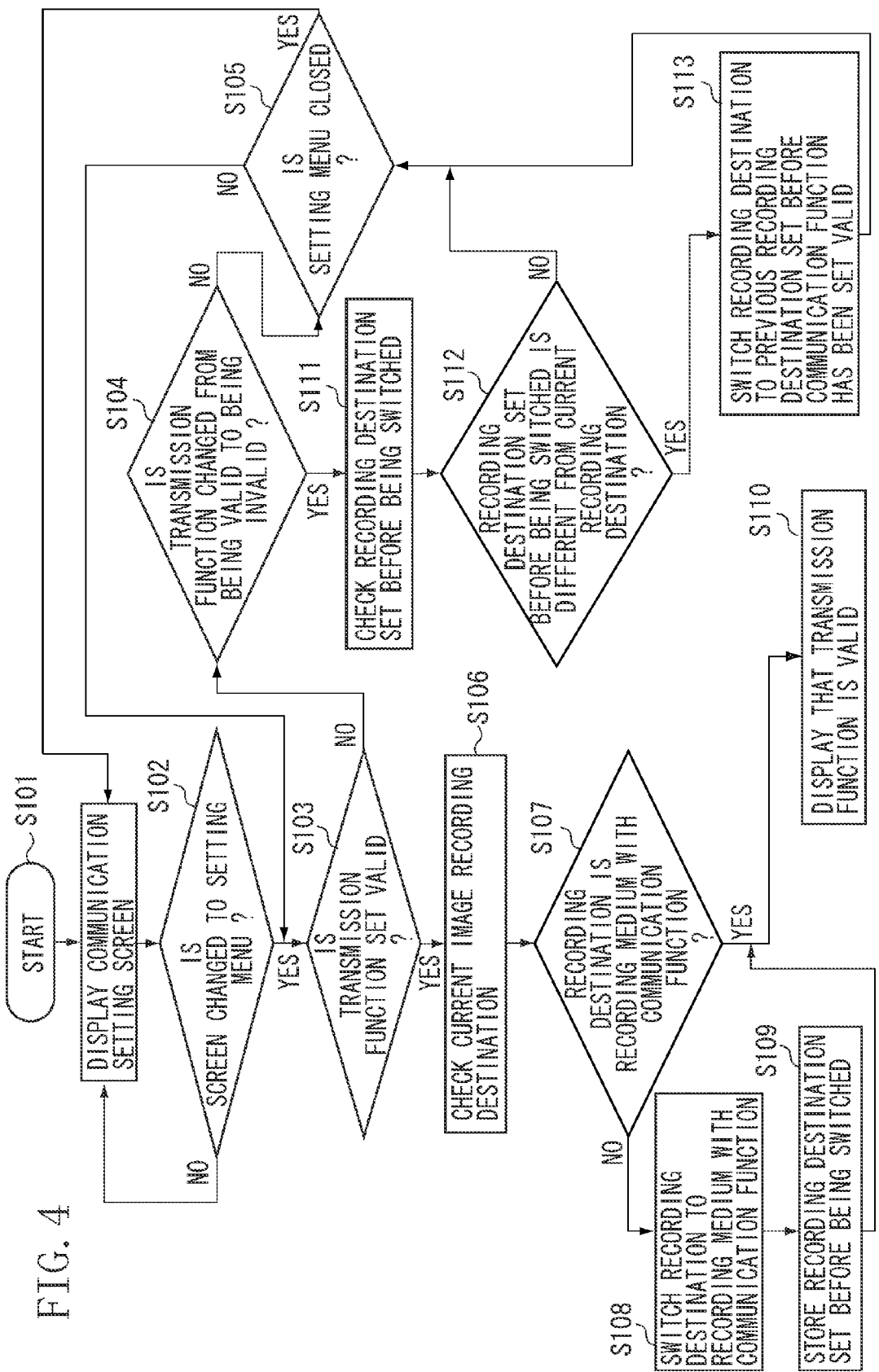
FIG. 4 is a flowchart illustrating processing performed by the camera according to the first exemplary embodiment.

Specific processing performed by the camera 10 of the present exemplary embodiment will be described below with reference to the drawings. FIG. 4 is a flowchart illustrating an operation of the camera of the present exemplary embodiment. The CPU 402 executes a program stored in the memory 428 to realize a flowchart illustrated in FIG. 4. In the descriptions below, the normal recording medium 430 and the recording medium 431 with communication function are already inserted into the slots for recording media of the camera 10.

The flowchart illustrated in FIG. 4 is started when the user presses the monitor switch 121 to cause the CPU 402 to turn on the LCD monitor device 417. Firstly, in step S101, the user presses the menu button 124 to cause the CPU 402 to display the GUI menu on the LCD monitor device 417. Further, the user selects the communication setting screen from the GUI menu using the cross switch 116, and then the CPU 402 displays the communication setting screen on the LCD monitor device 417.

In step S102, the CPU 402 determines whether the user switches the communication setting screen to a setting menu for selecting either "VALID" or "INVALID" for the transmission function. This setting menu includes, for example, as illustrated in FIGS. 3A and 3B, so-called radio buttons for selecting "VALID" or "INVALID" for the transmission function. When the CPU 402 detects a switching operation (YES in step S102), the processing proceeds to step S103. When the CPU 402 does not detect the switching operation (NO in step S102), the processing returns to step S101.

Next, in step S103, the CPU 402 determines whether the user selects "VALID" for the transmission function. When the user selects "VALID" (YES in step S103), the transmission function is set valid, and then the processing proceeds to step S106. When the user does not select "VALID" (NO in step S103), the processing proceeds to step S104. In step S104, the CPU 402 determines whether the user selects to switch the transmission function to "INVALID" from "VALID". When the user selects "INVALID" (YES in step S104), the transmission function is set invalid, and then the processing proceeds to step S111.

When the user does not select "INVALID" (NO in step S104), the processing proceeds to step S105. In step S105, the CPU 402 determines whether the user selects to close the menu. When the user selects to close the menu (YES in step S105), the processing returns to step S101. When the user does not select to close the menu (NO in step S105) the processing returns to step S103 to continue to display the setting menu.

In step S106, the CPU 402 reads current image-data-recording-destination information stored in the memory 428 and checks the recording medium of the recording destination. In step S107, the CPU 402 determines whether the current recording destination of the image data is the recording medium with communication function. When the current recording destination is the recording medium with communication function (YES in step S107), the processing proceeds to step S110. When the current recording destination is not the recording medium with communication function (NO in step S107), the processing proceeds to step S108.

In step S108, the CPU 402 switches the recording destination of the image data from the normal recording medium to the recording medium with communication function. In step S109, the CPU 402 stores the recording medium checked in step S106 in the memory 428 as the information about the pre-valid recording destination set before the transmission function becomes valid. The CPU 402 updates the current image-data-recording-destination information to include the recording medium with communication function, which is the updated recording medium, and then stores the updated image-data-recording-destination information in the memory 428.

In step S110, the CPU 402 notifies on the LCD monitor device 417 that the transmission function is valid. To display this notification, a light emitting diode (LED) may be used, or a mark may be displayed on the LCD monitor device 417 to notify the user.

Next, a case will be described where, in step S104, the user selects "INVALID" from "VALID" to switch the transmission function and then the processing proceeds to step S111. In step S111, as in step S109 in the previous processing, the CPU 402 reads the information about the pre-valid recording destination stored in the memory 428, and checks the recording medium of the recording destination set before the transmission function becomes valid.

In step S112, the CPU 402 reads the current image-data-recording-destination information stored in the memory 428 and checks the recording medium of the recording destination. Subsequently, the CPU 402 determines whether the current image-data-recording-destination information corresponds to the information about the pre-valid recording destination read in step S111. More specifically, the CPU 402 determines whether the recording medium of the current recording destination corresponds to the recording medium of the recording destination set before the transmission function becomes valid. When the recording medium of the current recording destination corresponds to the recording medium of the recording destination set before the transmission function becomes valid (NO in step S112), the CPU 402 retains the recording medium of the current recording destination, and then processing proceeds to step S105. When the recording medium of the current recording destination does not correspond to the recording medium of the recording destination set before the transmission function becomes valid (YES in step S112), the processing proceeds to step S113.

In step S113, the CPU 402 switches the recording destination of the image data to the recording medium of the recording destination set before the transmission function becomes valid based on the information of the pre-valid recording destination stored in the memory 428. Further, the CPU 402 updates the current image-data-recording-destination information to include the updated recording medium, and then stores the updated image-data-recording-destination information in the memory 428.

As described above, the camera 10 automatically switches the recording medium of the recording destination for recording the image data according to the setting of the transmission function. With this arrangement, since the user does not have to set a desired recording destination, operability of the camera 10 can be improved. Further, when capturing the image to be transmitted is completed and the transmission function is set to be invalid, the recording destination automatically returns to the recording medium, which is previously, manually set by the user. Therefore, it can be avoided that the recording medium different from the recording destination manually set by the user is continuously set as the recording destination while the user does not notice.

Figure 5:
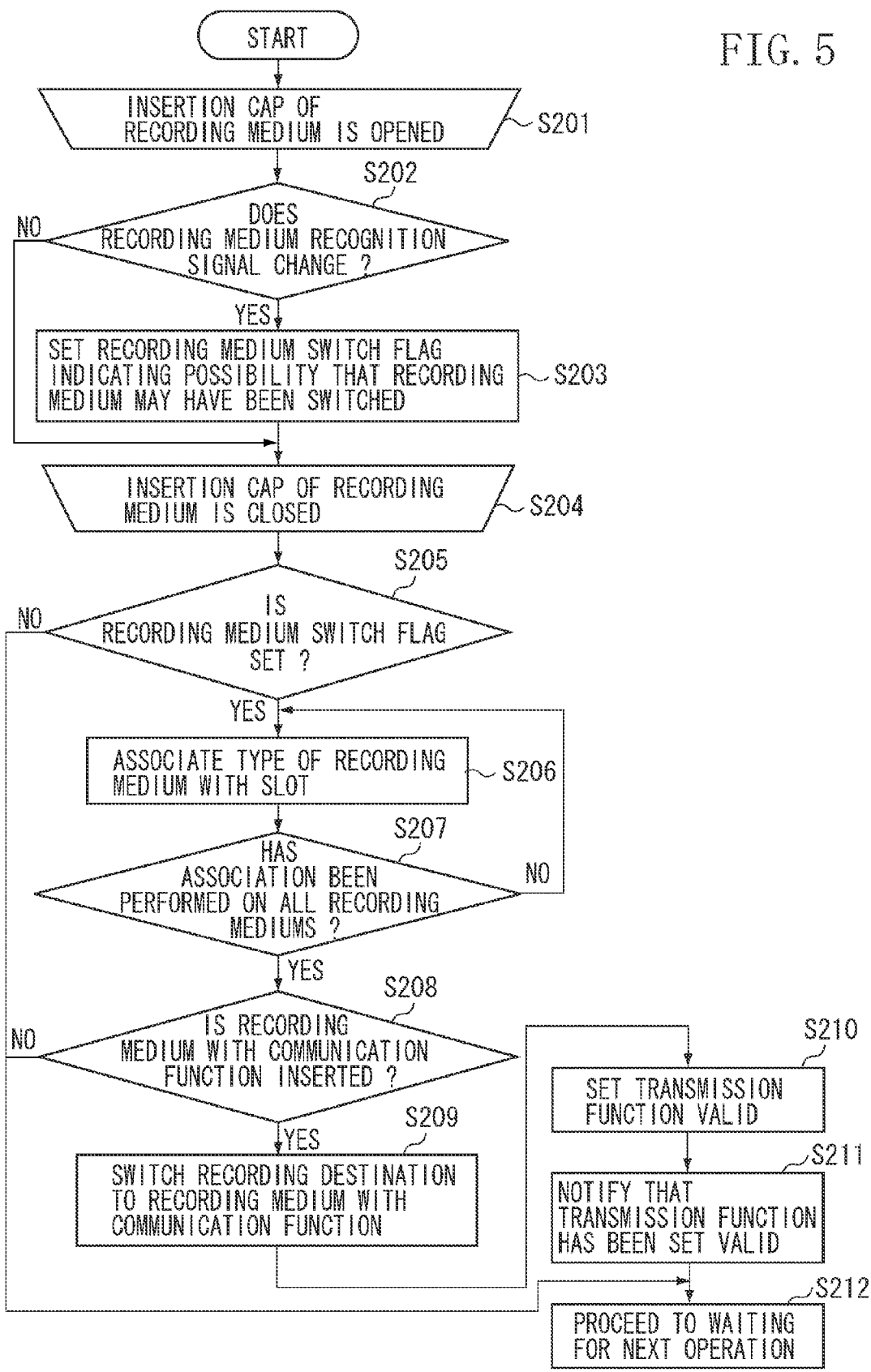
FIG. 5 is a flowchart illustrating processing performed when a recording medium is mounted.

FIG. 5 is a flowchart illustrating processing performed by the camera when the user opens an insertion cap for a recording medium and inserts the recording medium into a slot for a recording medium. The flowchart illustrated in FIG. 5 can be realized when the CPU 402 executes a program stored in the memory 428. In step S201, the user opens the insertion cap for a recording medium of the camera 10. In step S202, via the switch sense circuit 410 for detecting various types of switches, the CPU 402 detects that the insertion cap for a recording medium is opened. Subsequently, the CPU 402 determines whether a recognition signal of the recording medium changes. This recognition signal indicates, for example, an identification (ID) of the recording medium. When the recognition signal changes (YES in step S202), the processing proceeds to step S203. When the recognition signal does not change (NO in step S202), the processing proceeds to step S204.

In step S203, the CPU 402 sets at the memory 428 a recording medium switch flag indicating a possibility that the recording medium may have been switched and stores the recording medium switch flag. This recording medium switch flag indicates a possibility that the type of a recording medium may have been switched while a power of the camera 10 is off. However, the recording medium switch flag does not always indicate that the type of a recording medium is actually switched. In step S204, the user closes the insertion cap for a recording medium of the camera 10.

In step S205, the CPU 402 detects via the switch sense circuit 410 that the insertion cap for a recording medium is closed. Subsequently, the CPU 402 determines whether the recording medium switch flag is set at the memory 428, in other words, whether the recording medium switch flag is stored in the memory 428. When the recording medium switch flag is not set (NO in step 205), the processing proceeds to step S212. When the recording medium switch flag is set (YES in step S205), the processing proceeds to step S206.

In step S206, the CPU 402 associates a type of the recording medium with the slot for a recording medium into which the recording medium is inserted, and stores the association in the memory 428. This processing is performed for each inserted recording medium on all recording media.

In step S207, the CPU 402 determines whether association is completed on all of the recording media. When association is not completed on all of the recording media (NO in step S207), the processing returns to step S206. When all association is completed on all of the recording media (YES in step S207), the processing proceeds to step S208.

In step S208, the CPU 402 determines whether the recording medium with communication function is inserted into the slot for a communication medium. When the recording medium with communication function is not inserted (NO in step S208), the processing proceeds to step S212. When the recording medium with communication function is inserted (YES in step S208), the processing proceeds to step S209.

In step S209, the CPU 402 switches the recording destination of the image data to the recording medium with communication function. In step S210, the CPU 402 automatically switches the transmission function of the communication setting to be valid. In step S211, the CPU 402 notifies on the LCD monitor device 417 that the transmission function has been set valid. To display this notification to the user, the LED may be used or the mark may be displayed on the LCD monitor device 417.

In step S212, the CPU 402 waits for a user's next operation, or the processing proceeds to a next sequence.

As described above, when the recording medium with communication function is mounted to the camera 10, the camera 10 automatically switches the recording destination of the image data to the recording medium with communication function. Further, the camera 10 automatically sets valid the transmission function of the communication setting. Accordingly, since the user does not have to perform setting of the desired recording destination or switching of the transmission function, the operability of the camera 10 can be improved.

When a plurality of recording media with communication function are inserted into the slots for a recording medium, for example, the CPU 402 previously determines a priority order based on an order of control performed by the recording medium I/F 419. The recording destination may be switched to the recording medium having higher priority in orders. Additionally, when a plurality of recording media with different types of communication functions are inserted, for example, the CPU 402 may switch the recording destination to the recording medium supporting a communication method specified by a setting inside the camera.

For example, a case will be described where the recording medium with a wireless LAN communication function of 802.11b/g and the recording medium with a communication function of 802.11a are inserted into the slots for a recording medium. In this case, when the camera is set to set the 802.11a communication valid, the CPU 402 automatically switches the recording destination to the recording medium with a communication function of 802.11a.

Further, a case will be described where the transmission function is set invalid and the recording medium with a wireless LAN communication function of 802.11b/g is connected to the recording medium I/F having higher priority in order of controlling recording media I/F 419. In this case, the CPU 402 may switch the recording destination to the recording medium with a wireless LAN communication function of 802.11b/g.

When the recording destination is automatically switched, the recording destination is not alternatively switched, but a case where a single recording medium is set as the recording destination may be switched to a case where a plurality of recording media are set as the recording destinations.

Figure 6:
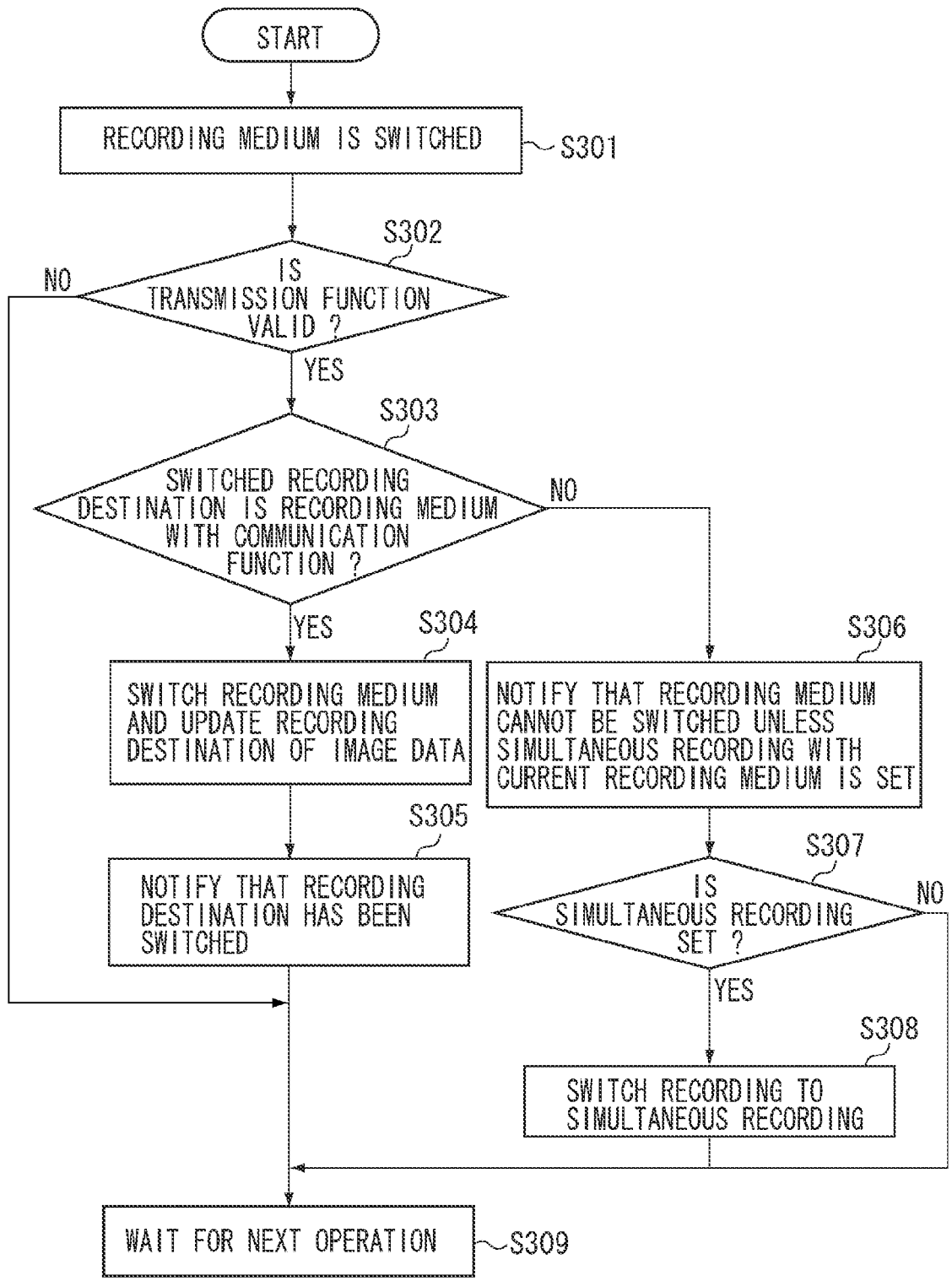
FIG. 6 is a flowchart illustrating processing performed when a recording destination of an image is switched.

FIG. 6 is a flowchart illustrating processing for switching the recording medium of the recording destination of the camera when the transmission function is set valid. The user switches the recording medium of the recording destination. The flowchart illustrated in FIG. 6 can be realized when the CPU 402 executes a program stored in the memory 428. The flowchart illustrated in FIG. 6 can be started when the user presses the monitor switch 121 to cause the CPU 402 to turn on the LCD monitor device 417.

Firstly, in step S301, the user presses the menu button 124 to cause the CPU 402 to display the GUI menu on the LCD monitor device 417. Further, the user selects a recording medium switch menu from the GUI menu using the cross switch 116 to cause the CPU 402 to display the recording medium switch menu on the LCD monitor device 417. Further, the user switches the recording destination to a desired recording medium from the recording medium switch menu, thereby causing the CPU 402 to switch the recording destination of the image data to the selected recording medium.

In step S302, the CPU 402 determines whether the transmission function of the communication setting is set valid. When the communication function is set valid (YES in step S302), the processing proceeds to step S303. When the communication function is not set valid (NO in step S302), the processing proceeds to step S309.

In step S303, the CPU 402 determines whether the recording medium of the recording destination switched in step S301 is the recording medium with communication function. When the recording medium switched in step S301 is the recording medium with communication function (YES in step S303), the processing proceeds to step S304. Here, a case is assumed where a plurality of recording media with communication function are inserted into the slots for a recording medium. When the recording medium switched in step S301 is not the recording medium with a communication function (NO in step S303), the processing proceeds to step S306.

In step S304, the CPU 402 updates the image-data-recording-destination information including the recording medium selected in step S301 as the recording destination, and stores the updated image-data-recording-destination information in the memory 428. In step S305, the CPU 402 notifies on the LCD monitor device 417 that the recording destination of the image data has been switched.

In step S309, the CPU 402 waits for a user's next operation.

In step S306, the CPU 402 notifies on the LCD monitor device 417 that, since the transmission function of the communication setting is set valid, the current recording medium cannot be switched. The CPU 402 may notify that recording cannot be performed unless both of the recording medium with communication function and the recording medium to be switched are simultaneously used.

In step S307, the CPU 402 displays on the LCD monitor device 417 selection of whether to simultaneously record the image data on both recording media of the current recording medium and the recording medium selected in step S301. When the CPU 402 detects that the user selects simultaneous recording (YES in step S307), the processing proceeds to step S308. When the CPU 402 does not detect that the user selects simultaneous recording (NO in step S307), the processing proceeds to step S309.

In step S308, the CPU 402 switches the recording destination to both of the recording medium with communication function set before the recording medium of the recording destination has been switched and the normal recording medium with no communication function selected in step S301.

As described above, when the transmission function of the communication setting is set valid and the recording destination of the image data is switched to the normal recording medium, the camera 10 records the image data not only on the normal recording medium but also on both of the normal recording medium and the recording medium with communication function. At this point, the camera 10 notifies the user that recording cannot be performed unless both of the normal recording medium and the recording medium with communication function are simultaneously used.

Therefore, the user can be prevented from inadvertently selecting a wrong recording medium. According to the present exemplary embodiment, when the transmission function is set valid, the setting is controlled to be prioritized so that the recording destination always includes the recording medium with communication function. However, the setting of the transmission function does not have to be always prioritized. For example, in step S307, an option for selecting whether to turn off the setting of the transmission function may be added. As described above, by providing a menu for prioritizing recording on the recording destination that has been switched to by the user, a user's intension can be more flexibly reflected.

Figure 7:
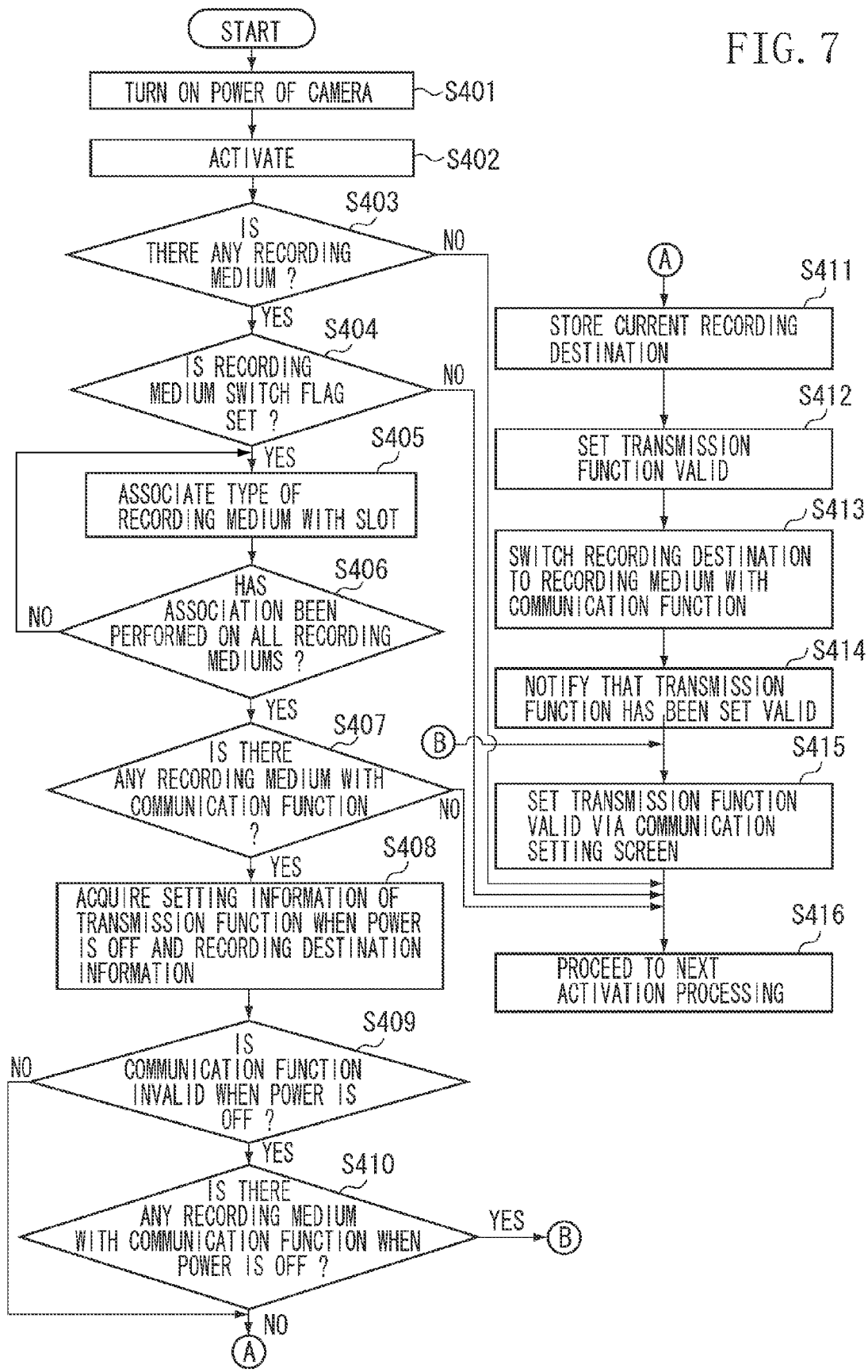
FIG. 7 is a flowchart illustrating processing performed when the camera is activated.

FIG. 7 is a flowchart illustrating processing performed when the camera is activated. The camera stores its own setting in the memory 428 when a power source is turned off. The flowchart illustrated in FIG. 7 can be realized when the CPU 402 executes a program stored in the memory 428.

Firstly, in step S401, the CPU 402 turns on the power of the camera 10 according to the user's operation. In step S402, the CPU 402 activates the camera 10 according to an activation sequence of the camera 10.

In step S403, in the activation sequence, the CPU 402 determines whether the recording medium is inserted into the slot for a recording medium. When the recording medium is inserted (YES in step S403), the processing proceeds to step S404. When the recording medium is not inserted (NO in step S403), the processing proceeds to step S416.

In step S404, the CPU 402 determines whether there is a possibility that the recording medium has been replaced when the camera has been off. More specifically, the CPU 402 determines whether the recording medium switch flag is stored in the memory 428. When the recording medium switch flag is stored (YES in step S404), the processing proceeds to step S405. When the recording medium switch flag is not stored (NO in step S404), the processing proceeds to step S416.

In step S405, the CPU 402 associates all types of the plurality of recording media with the slots for a recording medium into which the recording media are inserted, and stores the association in the memory 428.

In step S406, the CPU 402 determines whether association is completed on all of the recording media. When association is not completed on all of the recording media (NO in step S406), the processing returns to step S405. When association is completed on all of the recording media (YES in step S406), the processing proceeds to step S407.

In step S407, the CPU 402 determines whether the recording medium with communication function is inserted into the slot for a recording medium. When the recording medium with communication function is not inserted (NO in step S407), the processing proceeds to step S416. When the recording medium with communication function is inserted (YES in step S407), the processing proceeds to step S408.

In step S408, the CPU 402 acquires the setting information about the transmission function and the image-data-recording-destination information as the information about the recording destination that have been set when the power has been turned off last time, which are stored in the memory 428.

In step S409, the CPU 402 determines whether the transmission function has been set invalid when the power has been turned off last time, based on the acquired setting information. When the transmission function has been set invalid (YES in step S409), the processing proceeds to step S410. When the transmission function has been set valid (NO in step S409), the processing proceeds to step S411.

In step S410, the CPU 402 determines whether the recording medium with communication function has been inserted into the slot for a recording medium when the power has been turned off last time, based on the acquired image-data-recording-destination information. When the recording medium with communication function has not been inserted (NO in step S410), the processing proceeds to step S411. When the recording medium with communication function has been inserted (YES in step S410), the processing proceeds to step S415.

In step S411, the CPU 402 stores the current image-data-recording-destination information in the memory 428 as the information of the pre-valid recording destination set before the transmission function becomes valid. In step S412, the CPU 402 sets the transmission function valid again. In step S413, the CPU 402 switches the recording destination of the image data to the recording medium with communication function, which is stored in the memory 428 as the current image-data-recording-destination information.

In step S414, the CPU 402 notifies on the LCD monitor device 417 that the transmission function has been set valid.

In step S415, the CPU 402 displays the setting menu on the communication setting screen to switch the transmission function to be valid. Timing when the CPU 402 displays the setting menu on the communication setting screen to switch the transmission function to be valid is not limited to the timing described above.

More specifically, for example, when the user turns on the LCD monitor device 417 with the monitor switch 121 and presses the menu button 124, the CPU 402 displays the setting menu on the communication setting screen.

At this point, the CPU 402 may switch the transmission function to be valid based on the setting information in which the transmission function is set valid, which is displayed on the communication setting screen. In step S416, the CPU 402 proceeds to next activation processing or an operation state.

As described above, when the recording medium with communication function is additionally mounted to the camera 10 when the power is off, the camera 10 automatically switches the recording destination of the image data to the recording medium with communication function. Further, the camera 10 automatically switches the transmission function of the communication setting to be valid. Therefore, since the user does not have to set the desired recoding destination or switch the transmission function, the operability of the camera 10 can be improved.

Next, processing of the camera according to a second exemplary embodiment of the present invention will be described. Since a configuration of the camera is similar to that in the first exemplary embodiment, the description will not be repeated. In the present exemplary embodiment, when the transmission function is set valid, which recording medium is set as the recording destination of the image data is notified to the user to improve conveniences for use.

Figure 8:
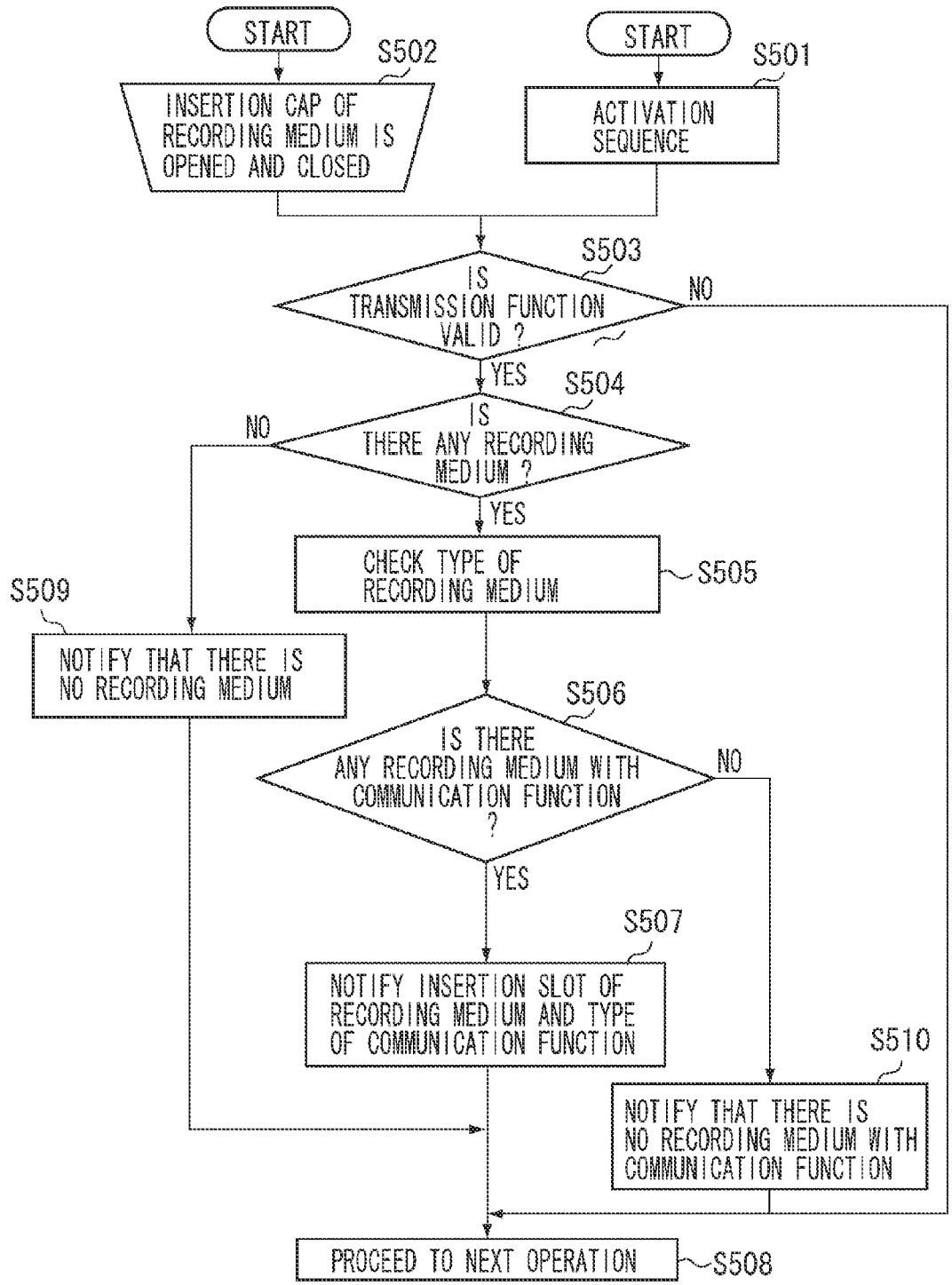
FIG. 8 is a flowchart illustrating processing performed by the camera according to a second exemplary embodiment of the present invention.

Specific processing by the camera 10 of the present exemplary embodiment will be described with reference to the drawings. FIG. 8 is a flowchart illustrating an operation performed by the camera 10 of the present exemplary embodiment. The flowchart illustrated in FIG. 8 can be realized when the CPU 402 executes a program stored in the memory 428.

The transmission function of the communication setting is set valid or invalid in the camera 10. To set the communication function valid or invalid, the user turns on the LCD monitor device 417 with the monitor switch 121, and presses the menu button 124 to display menu items of the transmission function setting.

Subsequently, after the setting menu is displayed on the communication setting screen with the cross switch 116, the user selects the transmission function to be set valid or invalid. The CPU 402 stores the setting information about the transmission function to be set valid or invalid in the memory 428.

Firstly, in step S501, the CPU 402 turns on the power of the camera 10 to activate the camera 10 according to the activation sequence thereof. In step S503, the CPU 402 determines whether the transmission function is set valid or invalid according to the setting information stored in the memory 428.

This determination does not have to be performed only after the activation is completed in step S501 but may be performed during activation processing. When the transmission function is set valid (YES in step S503), the processing proceeds to step S504. When the transmission function is set invalid (NO in step S503), the processing proceeds to step S508.

In step S504, the CPU 402 determines whether the recording medium is inserted into the slot for a recording medium. When the recording medium is inserted (YES in step S504), the processing proceeds to step S505. When the recording medium is not inserted (NO in step S504), the processing proceeds to step S509. The CPU 402 notifies on the LCD monitor device 417 that no recording medium has been inserted.

In step S505, the CPU 402 detects a type of the recording medium inserted into the slot for a recording medium. The type of the recording medium may be detected by reading information about the type of the recording medium stored in the memory 428, or by directly accessing the recording medium I/F 419 to check all recording media.

In step S506, the CPU 402 determines whether the recording medium with communication function is inserted into the slot for a recording medium. When the recording medium is inserted (YES in step S506), the processing proceeds to step S507. When the recording medium is not inserted (NO in step S506), the processing proceeds to step S510. The CPU 402 then notifies on the LCD monitor device 417 that no recording medium with communication function is inserted.

In step S507, the CPU 402 notifies the user of the slot for recording into which the recording medium with communication function is inserted on the LCD monitor device 417, and further prompts the user to set the recording medium with communication function as the recording destination of the image data. At this point, the CPU 402 may also notice the user of a type of a communication method. When a plurality of recording media with communication function are inserted into the slots for a recording medium, all of the slots for recording of the inserted recording media with communication function and the information about the communication method are notified. In this case, the CPU 402 displays a selection menu in which the user can select the recording medium with a communication function for recording the image data from among the plurality of recording media with communication function.

In step S508, the CPU 402 proceeds to a next operation. The flowchart illustrated in FIG. 8 may start not only when the power is turned on but also when there is a possibility that the insertion cap of the recording medium is opened/closed and the recording medium is replaced while the camera 10 is being activated as described in step S502.

As described above, the camera 10 prompts the user to set the recording medium with communication function as the recording destination of the image data, when the recording medium with communication function is mounted. Therefore, the user can never forget to set the recording medium with communication function as the desired recording destination.

Each unit included in the imaging apparatus of the present exemplary embodiment or each step of a control method performed by the imaging apparatus can be realized when the CPU executes a program stored in a memory such as a random access memory (RAM) and a read only memory (ROM). A computer-readable storage medium storing the program is included in the present invention.

Further, controlling the camera 10 described above may be performed by one hardware device such as the CPU, or may be shared by a plurality of hardware devices so that the entire apparatus can be controlled. Furthermore, the present invention may be applied as an exemplary embodiment, for example, a system, an apparatus, a method, or a non-transitory storage medium. More specifically, the present invention may be also applied to a system including a plurality of devices.

The present invention supplies a program of software that realizes the functions of the above-described exemplary embodiments directly or remotely to the system or the apparatus. The present invention also includes a case where the functions can be realized by reading and executing the program code supplied to computer hardware of the system or the apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-167128 filed Jul. 15, 2009, which is hereby incorporated by reference herein in its entirety.

What is claimed is:

1. An imaging apparatus comprising:
    an image recording unit configured to record captured image data on a first recording medium with no wireless communication function and a second recording medium with a wireless communication function, wherein the second recording medium is detachable;
    a recording destination setting unit configured to set a recording destination to which the image data is to be recorded by the image recording unit, wherein the recording destination setting unit can set the recording destination based on a user's operation; and
    a transmission setting unit configured to set whether to transmit the image data to an external apparatus by the wireless communication function of the second recording medium,
    wherein, if the transmission setting unit sets the image data to be transmitted to the external apparatus, the recording destination setting unit automatically sets the second recording medium as the recording destination of the captured image data.

2. The imaging apparatus according to claim 1, further comprising a storage unit configured to store a recording destination set before the recording destination setting unit has automatically set the second recording medium as the recording destination,
    wherein, if the transmission setting unit switches a setting for transmitting the image data to the external apparatus to a setting not for transmitting the image data thereto, the recording destination setting unit switches the recording destination to the recording destination that has been stored by the storage unit.

3. The imaging apparatus according to claim 1, further comprising a determination unit configured to determine whether the second recording medium is mounted, wherein, if the determination unit determines that the second recording medium is mounted, the transmission setting unit sets the image data to be transmitted to the external apparatus.

4. The imaging apparatus according to claim 1, wherein, if the transmission setting unit sets the image data to be transmitted to the external apparatus and a user operation selects the first recording medium as the recording destination of the image data, the recording destination setting unit sets the recording destination to include the second recording medium.

5. The imaging apparatus according to claim 4, further comprising a notification unit configured to notify a user that both the first recording medium and the second recording medium can be set as the recording destination.

6. The imaging apparatus according to claim 1, wherein, if the transmission setting unit sets the image data to be transmitted to the external apparatus and a user operation selects the first recording medium as the recording destination of the image data, the recording destination setting unit sets both the first recording medium and the second recording medium as the recording destination.

7. An imaging apparatus comprising:
   a recording unit configured to record captured image data on a first recording medium with no wireless communication function and a second recording medium with a wireless communication function, which is detachable;
   at least one slot from which a detachable recording medium is detachable;
   a recording destination setting unit configured to set a recording destination to which the image data is to be recorded by the recording unit, wherein the recording destination setting unit can set the recording destination based on a user's operation;
   a transmission setting unit configured to set whether to transmit the image data to an external apparatus; and
   a notification unit configured to, if the transmission setting unit sets the image data to be transmitted to the external apparatus, prompt a user to set the second recording medium as a recording destination of the captured image data.

8. The imaging apparatus according to claim 7, wherein the notification unit notifies the user of a slot into which the second recording medium is mounted.

9. A method for controlling an imaging apparatus, the method comprising:
   recording captured image data on a first recording medium with no wireless communication function and a second recording medium with a wireless communication function, which is detachable;
   setting a recording destination to which the image data is to be recorded, wherein the recording destination can be set based on a user's operation;
   setting whether to transmit the image data to an external apparatus; and
   if the image data is set to be transmitted to the external apparatus, automatically setting the second recording medium as the recording destination of the captured image data.

10. A method for controlling an imaging apparatus including at least one slot from which a detachable recording medium is detachable, the method comprising:
    recording captured image data on a first recording medium with no wireless communication function and a second recording medium with a wireless communication function, which is detachable;
    setting a recording destination to which the image data is to be recorded, wherein the recording destination can be set based on a user's operation;
    setting whether to transmit the image data to an external apparatus; and
    if the image data is set to be transmitted to the external apparatus, prompting a user to set the second recording medium as a recording destination of the captured image data.

* * * * *